(12) United States Patent
Wang

(10) Patent No.: US 8,541,679 B2
(45) Date of Patent: Sep. 24, 2013

(54) PHOTO-VOLTAIC POWER GENERATION EQUIPMENT THAT CAN AUTOMATICALLY TRACK THE SUN

(75) Inventor: Xinghua Wang, Jiangsu (CN)

(73) Assignee: ET Energy Company Limited, Jiangsu (CN)

( * ) Notice: Subject to any disclaimer, the term of this patent is extended or adjusted under 35 U.S.C. 154(b) by 247 days.

(21) Appl. No.: 12/995,629

(22) PCT Filed: Jan. 4, 2009

(86) PCT No.: PCT/CN2009/000005
§ 371 (c)(1),
(2), (4) Date: Dec. 1, 2010

(87) PCT Pub. No.: WO2010/069115
PCT Pub. Date: Jun. 24, 2010

(65) Prior Publication Data
US 2011/0168241 A1 Jul. 14, 2011

(30) Foreign Application Priority Data
Dec. 18, 2008 (CN) ...................... 2008 2 0214902 U

(51) Int. Cl.
*H02N 6/00* (2006.01)
*H01L 31/042* (2006.01)
(52) U.S. Cl.
USPC ......................................................... 136/246
(58) Field of Classification Search
USPC .......................... 136/244, 255, 246; 250/215
See application file for complete search history.

(56) References Cited

U.S. PATENT DOCUMENTS

| | | | | |
|---|---|---|---|---|
| 4,172,739 A | * | 10/1979 | Tassen | 136/246 |
| 4,215,410 A | * | 7/1980 | Weslow et al. | 700/61 |
| 4,574,659 A | * | 3/1986 | Arndt | 475/5 |
| 4,883,340 A | | 11/1989 | Dominguez | |
| 7,381,886 B1 | * | 6/2008 | Aiken et al. | 136/246 |
| 2005/0217665 A1 | * | 10/2005 | Luconi | 126/696 |
| 2007/0215199 A1 | * | 9/2007 | Dold et al. | 136/246 |

FOREIGN PATENT DOCUMENTS

| | | |
|---|---|---|
| CN | 2626054 Y | 7/2004 |
| CN | 201213244 Y | 3/2009 |
| EP | 1601022 A1 * | 11/2005 |
| ES | 2282034 A1 * | 10/2007 |
| JP | 2007180484 A | 7/2007 |
| WO | 2007090908 A1 | 8/2007 |
| WO | WO 2007090908 A1 * | 8/2007 |

* cited by examiner

*Primary Examiner* — Eli Mekhlin
(74) *Attorney, Agent, or Firm* — The Webb Law Firm

(57) ABSTRACT

This invention relates to a type of solar energy photo-voltaic power generation equipment that can automatically track the sun. This device includes a pedestal installed on a mounting platform. On the pedestal, a main support frame is provided. On the support frame, a solar cell panel platform is provided. On this platform, a solar energy photo-voltaic assembly is installed. The pedestal is connected to the mounting platform and can rotate relative to the mounting platform. On the pedestal, a circumferentially driven planet reduction gear is installed. On the main support frame, a platform elevation angle adjustment lifter is installed. The end of the telescopic link on the lifter is hinged to the solar cell panel platform. The circumferentially driven planet reduction gear and platform elevation angle adjustment lifter are connected to an electric control device.

9 Claims, 3 Drawing Sheets

US 8,541,679 B2

PHOTO-VOLTAIC POWER GENERATION EQUIPMENT THAT CAN AUTOMATICALLY TRACK THE SUN

TECHNICAL FIELD

This invention relates to a type of solar energy photo-voltaic power generation equipment that can automatically track the sun, which belongs to solar energy application technical field.

BACKGROUND OF THE INVENTION

Related Art

With development of solar energy photo-voltaic power generation, solar energy photo-voltaic power generation systems of independent operation and synchronized with a grid are playing an important role in power supply for remote places where other power supplies are not available and in mitigating of short power supply in cities respectively. A photo-voltaic system synchronized with a grid is becoming a hot point of research worldwide whether independent or synchronized with grid, how to make use of limited space and area, and increase efficiency of a photo-voltaic power generation system, so as to gain maximum energy, has become an important issue. If automatic tracking device can be used for solar energy collection equipment, so that sunlight is always perpendicular on solar energy collector, solar radiation received will be greatly increased. Therefore, use of automatic sun tracking systems can effectively increase solar energy utilization rate.

At present, domestic scientific workers and enterprises have developed some tracking devices, but only in laboratories, mainly due to small increase of efficiency by use of tracking system as compared with costs of tracking device, or low reliability, complicated structure, large power and high energy consumption of tracking motor, or complicated circuits (their electronic elements are subject to very easy damage in severe outdoor environment during winter and summer) of such devices designed. Owing to large increase of efficiency, 2-axis tracking system is the focus of R&D. Up to now, no domestic 2-axis tracking system has been verified by works of scale, and in particular, medium and large size 2-axis tracking systems that can be used for synchronized photo-voltaic power generation are absent.

Nearest existing technology is single axis tracking system that can only adjust photo-voltaic assembly inclination angle. Such system comprises a pedestal, a solar energy photo-voltaic assembly, a solar cell platform, support, lifter, and control system. Lower ends of said support are fixed on the pedestal on ground. The solar cell platform with solar energy photo-voltaic assembly is installed on top of the support. On side of this solar cell platform is connected to support upper end via a rotating shaft, and the other end is connected to lifting link of the lifter. The control system generates control signals to drive the lifter. Driven by the lifting link of the lifter, solar cell platform will rotate around the shaft, realizing automatic tracking of sunlight in the direction of elevation angle.

SUMMARY OF THE INVENTION

To improve adjustment by existing automatic sun-tracking device, which can only adjust tilting angle of photo-voltaic assembly in a limited range, so that direct (perpendicular) incidence of sunlight on solar cell platform cannot be ensured all the time, this utility model provides a type of photo-voltaic power generation equipment that can automatically track the sun with higher degrees of freedom of adjustment.

In one embodiment, the present invention is directed to the following: A type of photo-voltaic power generation equipment that can automatically track the sun, comprising pedestal installed on mounting platform, main support frame installed on pedestal, solar cell panel platform installed on main support frame, and solar energy photo-voltaic assembly installed on solar cell panel platform, said pedestal is connected to and rotates relative to mounting platform, and pedestal circumferentially driven planet reduction gear is installed on pedestal; said main support frame includes left and right main support arms, the upper ends of which are hinged to solar cell panel platform and the lower ends of which are fixed on pedestal, forming a "V" type structure of angle δ in 110°·130°; between left and right main support arms is a cross beam, on which platform elevation angle adjustment lifter is fixed; end of telescopic link of lifter is hinged to solar cell panel platform, hinge points of main support arms are right above pedestal, and these hinges points are not on the same straight line with the hinge point of telescopic link; said pedestal circumferentially driven planet reduction gear and platform elevation angle adjustment lifter are connected to electric control device. In this way, based on sole pitch adjustment, circumferential adjustment of solar energy photo-voltaic assembly is realized, so that degrees of freedom of track of sun are increase and sunlight will always be incident on the assembly perpendicularly, increasing solar energy absorption and utilization rate.

To further realize easy circumferential rotation of the pedestal: said pedestal comprises rotor disc bearing fixed on mounting platform and rotor disc cover that can rotate circumferentially inside rotor disc bearing; an internal gear is provided on rotor disc bearing, pedestal circumferentially driving motor is installed on rotor disc bearing cover, and output end of pedestal circumferentially driven planet reduction gear is provided with a planet gear, which engages internal gear on rotor disc bearing. Pedestal circumferentially driven planet reduction gear is used as driving power source to drive the pedestal for circumferential rotation by gear transmission.

To further enhance load bearing capacity of main support frame, said main support arms include at least 2 left arms and 2 right arms installed and fixed symmetrically. Besides, said main support arms at each side are installed in the shape of "^" (angle α is 17°·25°), upper ends of main support arms are combined and hinged to solar cell panel platform, and their lower ends are fixed on outer circumference of pedestal.

To further enhance load bearing capacity of support, at middle part of said main support frame, an auxiliary support frame is provided and consists of 4 auxiliary support arms; upper ends of said auxiliary support arms are combined and hinged to solar cell panel platform, these hinged points are on the same straight line with hinged points of main support arms, and lower ends of auxiliary support arms are fixed on pedestal; cross beam is installed and fixed at one side of auxiliary support arms.

To avoid sharp turn of solar cell panel platform during adjustment resulting in equipment damage, buffering air spring is further provided at hinge between main support arm and solar cell panel platform.

To achieve optimum stress and applied force at telescopic link supporting the solar cell panel platform, included angle β between moving direction of said telescopic link and horizontal direction is 60°·80°. To always maintain perpendicular incidence of sunlight during use of the equipment, said pedestal rotation angle is 360° and adjustment range of platform elevation angle γ is 0°·55°.

This utility model realizes circumferential and pitching adjustment of photo-voltaic power generation equipment, increases adjustment degrees of freedom for automatic tracking of the sun, and improves absorption and utilization rate of sunlight. Besides, this equipment features high structural strength, can withstand very large dynamic load and adapt to complicated and severe outdoor operation environment, and has very strong resistance against wind. Grade 12 hurricane and max. wind speed of 135 km/h can be withstood. On photo-voltaic assembly mounting plane, most photo-voltaic assemblies currently manufactured can be installed. Also, it is not necessary to bury the pedestal underground, allowing easy manufacture, assembling, installation, and maintenance, and high performance-price ratio of complete set system.

In the figures: 1. Pedestal; 1-1. Rotor disc bearing; 1-2. Rotor disc bearing cover; 1-3. Internal gear; 2. Main support frame; 2-1. Main support arm; 2-2. Cross beam; 3. Solar cell panel platform; 4. Solar energy photo-voltaic assembly; 5. Planet reduction gear; 6. Platform elevation angle adjustment lifter; 7. Telescopic link; 8. Electric control device; 9. Mounting platform; 11. Auxiliary support frame; 11-1. Auxiliary support arm; 12. Air spring

DESCRIPTION OF THE PREFERRED EMBODIMENTS

Figure 1:
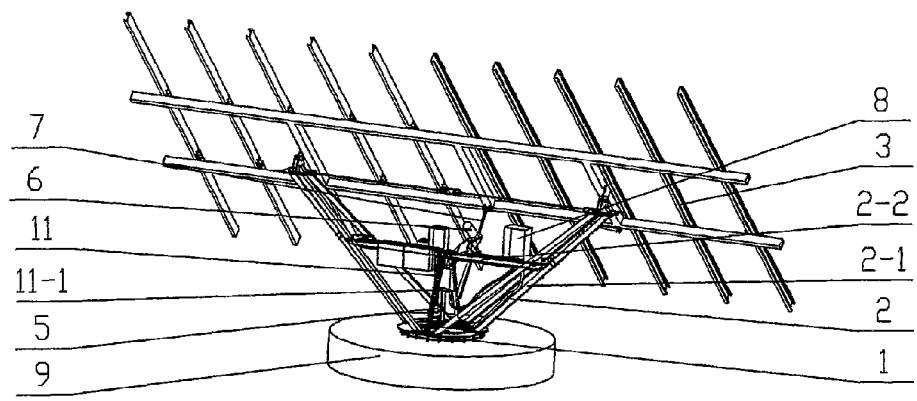
FIG. 1 is a schematic of support V structure according to one embodiment of this invention.
Figure 3:
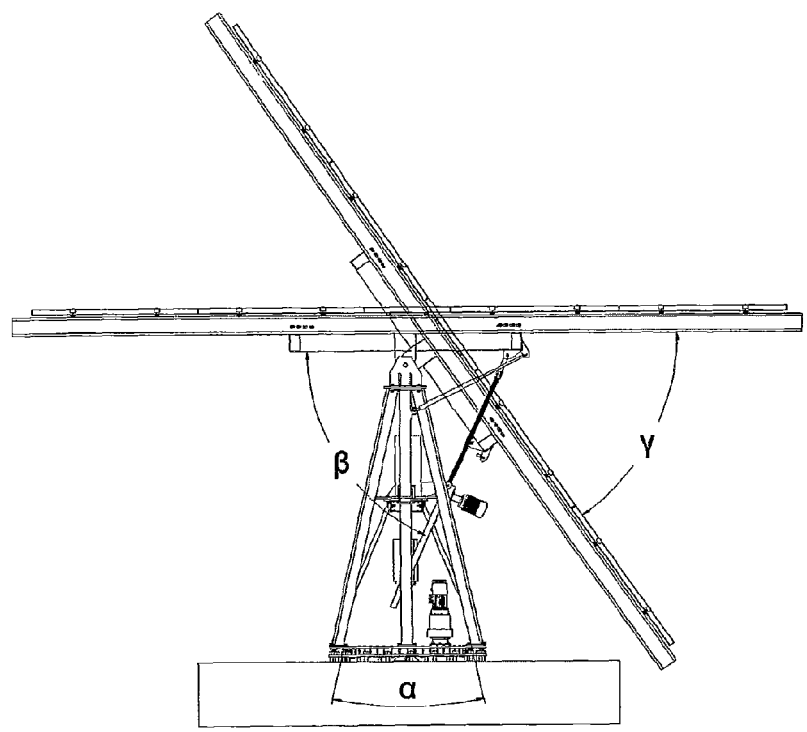
FIG. 3 is a structural schematic of elevation angle adjustment status according to one embodiment of this invention.
Figure 4:
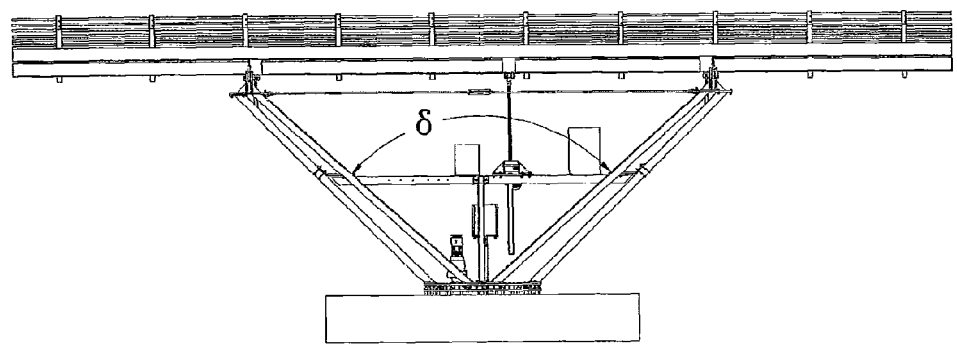
FIG. 4 is a front structural schematic according to one embodiment of this invention when solar cell panel platform is horizontal.
Figure 5:
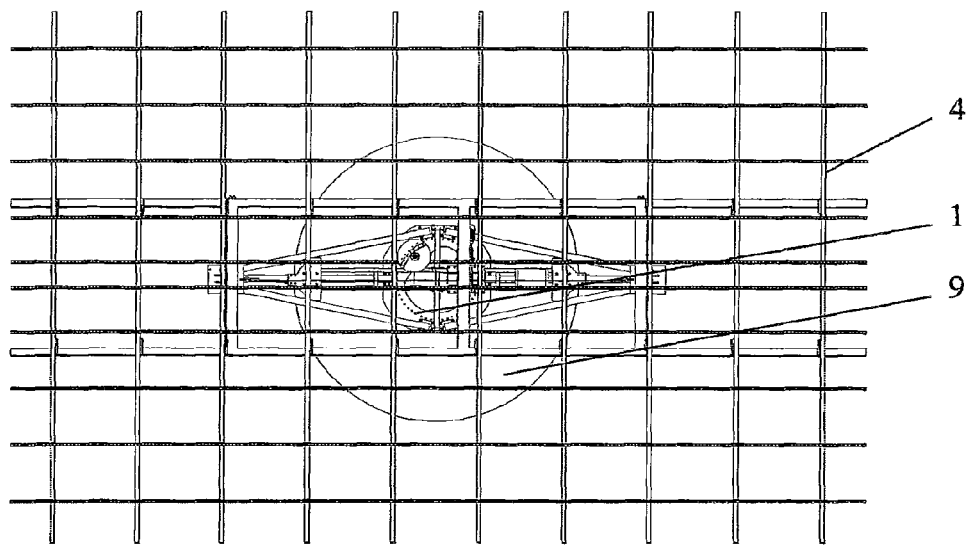
FIG. 5 is a structural schematic of top view of FIG. 4.
Figure 6:
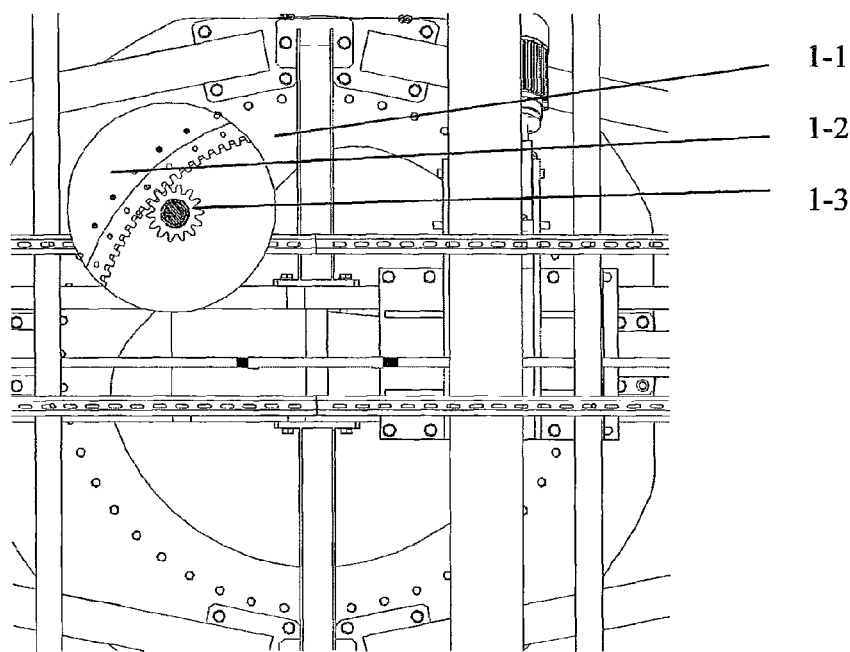
FIG. 6 is a structural schematic of pedestal.

FIG. 1 shows a type of photo-voltaic power generation equipment that can automatically track the sun. This equipment features pedestal 1 installed on mounting platform 9. On said pedestal 1, embedded parts can be provided for fixing and connection with mounting platform 9. On pedestal 1, main support frame 2 is provided, on which solar cell panel platform 3 is installed. On platform 3, solar energy photo-voltaic assembly 4 is provided. Said main support frame 2 comprises left and right main support arms 2-1 (in the shape of a fork). Upper ends of main support arms 2-1 are hinged to solar cell panel platform 3, and their lower ends are fixed on pedestal 1. The whole support is in the shape of a "V" of angle δ in 110°·130°, as shown in FIG. 4. At each side, 3 main support arms 2-1 are provided, ensuring sufficient structural strength. At each side, main support arms 2-1 are installed in the shape of "^" and angle α between outmost two main support arms 2-1 is 17°·25°, as shown in Fig. Upper ends of main support arms 2-1 are combined and hinged to solar cell panel platform 3, and air spring 12 is provided at this hinge for buffering. Their lower ends are fixed on pedestal 1 outer circumference. As shown in FIG. 5 and FIG. 6, said pedestal 1 comprises rotor disc bearing 1-1 fixed on mounting platform 9 and rotor disc bearing cover 1-2 that can rotate circumferentially inside rotor disc bearing 1-1. Inside rotor disc bearing 1-1, an internal gear 1-3 is provided. On rotor disc bearing cover 1-2, pedestal circumferentially driven planet reduction gear 5 is installed. At output end of this reduction gear 5, an external gear 1-4 is provided and engages internal gear 1-3 on rotor disc bearing 1-1. Deflection angle of rotor disc bearing cover 1-2 is ±120°. Between left and right main support arms 2-1 is cross beam 2-2 on which platform elevation angle adjustment lifter 6 is fixed. End of telescopic link 7 on lifter 6 is hinged to solar cell panel platform 3. Included angle β between moving direction of telescopic link 7 and horizontal direction is 60°·80°, as shown in FIG. 3. Main support arms 2-1 hinge points are right above pedestal 1, so that center of gravity of solar cell panel platform and solar energy photo-voltaic assembly supported by them is just at center of pedestal 1, allowing more even stress distribution. Hinged point of telescopic link 7 and hinged points of main support arms 2-1 are not on the same straight line, so that when telescopic link 7 is driven by platform elevation angle adjustment lifter 6, solar cell panel platform 3 moves in luffing, and adjustment range of platform elevation angle γ is 0°·55°. Both said pedestal circumferentially driven planet reduction gear 5 and said platform elevation angle adjustment lifter 6 are connected to electric control device 8, which controls them.

Figure 2:
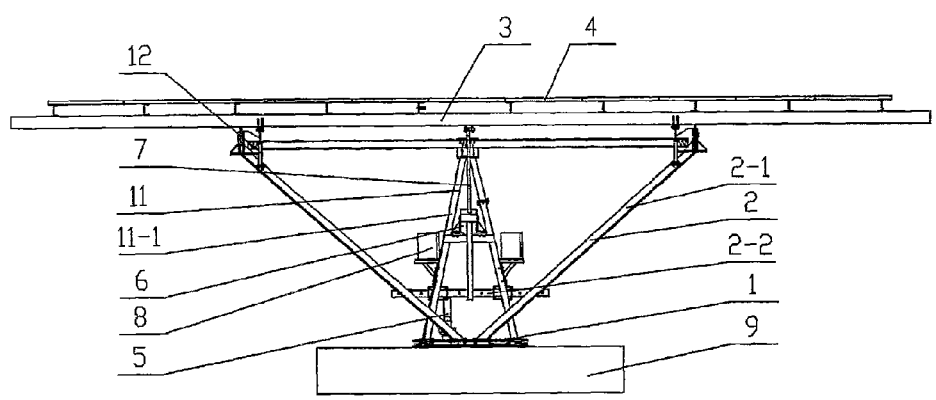
FIG. 2 is a schematic of support W structure according to one embodiment of this invention.

Another preferred embodiment is shown in FIG. 2. At middle part of main support frame 2, auxiliary support frame 11 is provided and comprises 4 auxiliary support arms 11-1. Upper ends of auxiliary support arms 11-1 are combined and hinged to solar cell panel platform 3, and these hinged points are on the same straight line with hinged points of main support arms 2-1. Lower ends of auxiliary support arms 11-1 are fixed on pedestal 1. Cross beam 2-2 is fixed at one side of auxiliary support arms 11-1. At this time, 2 main support arms 2-1 are installed at each side and symmetrically fixed. The whole support is in the shape of "W".

During operation, solar energy photo-voltaic assembly 4 senses angle of sunlight and feedback this information to the electric control device 8, which will activate movement control of pedestal circumferentially driven planet reduction gear 5 and platform elevation angle adjustment lifter 6. Reduction gear 5 will move main support frame 2 carrying solar energy photo-voltaic assembly 4 in circumferential direction, while lifter 6 will pitch solar energy photo-voltaic assembly 4, finally keeping this assembly 4 at the position perpendicular to sunlight.

Single set capacity of the photo-voltaic equipment of this utility model is 11 KW and its maximum power can reach 12 KW. This equipment can adopt various types of solar energy assemblies and provide 35% increase of efficiency than fixed type solar energy assemblies. Compared with solar energy system with single axis tracking system, increase of efficiency exceeds 15%.

For technical personnel in this technical field, above two preferred embodiments can be reproduced after reading these instructions and creative work is not required. Of course, based on this utility model, various forms of embodiment are possible, and can be reproduced by technical personnel in this field, after reading these instructions and not requiring creative work.

What is claimed is:

1. A type of photo-voltaic power generation equipment that can automatically track the sun, comprising:
a pedestal installed on a mounting platform;
a main support frame installed on the pedestal;
a solar cell panel platform installed on the main support frame; and a solar energy photo-voltaic assembly installed on the solar cell panel platform, wherein:

the pedestal is connected to and rotates relative to the mounting platform, and a pedestal circumferentially driven planet reduction gear is installed on the pedestal;

the main support frame includes at least two left and at least two right main support arms fixed symmetrically, wherein upper ends of the left and right main support arms are hinged to the solar cell panel platform and lower ends of the left and right main support arms are fixed on the pedestal, forming a "V" type structure having an angle of 110° to 130°;

between the left and right main support arms and intermediate the upper and lower ends of the left and right main support arms is a cross beam on which a platform elevation angle adjustment lifter is fixed;

an end of a telescopic link of the platform elevation angle adjustment left is hinged to the solar cell panel platform, hinge points of the main support arms are above the pedestal, and these hinge points are not on a same straight line with the hinge point of the telescopic link; and the pedestal circumferentially driven planet reduction gear and the platform elevation angle adjustment lifter are connected to an electronic control device;

wherein, at a middle part of the main support frame an auxiliary support frame is provided and includes four auxiliary support arms; all upper ends of the auxiliary support arms are combined and hinged to a middle part of the solar cell panel platform at a singular hinged point that is independent of the hinged points of the main support arms, wherein the auxiliary support arm hinged point is on the same straight line with the hinged points of the main support arms, and lower ends of the auxiliary support arms are fixed directly on the pedestal; the cross beam is installed and fixed at one side of the auxiliary support arms.

2. The photo-voltaic power generation equipment that can automatically track the sun of claim 1, wherein the pedestal comprises a rotor disc bearing fixed on a mounting platform and a rotor disc bearing cover that can rotate circumferentially inside the rotor disc bearing; an internal gear is provided on the rotor disc bearing, a pedestal circumferentially driving motor is installed on the rotor disc bearing cover, and an output end of the pedestal circumferentially driven planet reduction gear is provided with a planet gear, which engages the internal gear on the rotor disc bearing.

3. The photo-voltaic power generation equipment that can automatically track the sun of claim 1, wherein the two left arms of the main support arms are installed in the shape of an inverted "V", the upper ends of the two left arms are combined and hinged to the solar cell panel platform, and the lower ends of the two left arms are fixed on an outer circumference of the pedestal.

4. The photo-voltaic power generation equipment that can automatically track the sun of claim 3, wherein the main support arms at each side is installed in the shape of an inverted "V" with an angle of 17° to 25°.

5. The photo-voltaic power generation equipment that can automatically track the sun of claim 1, wherein a buffering air spring is provided at the hinge between the main support arms and the solar cell panel platform.

6. The photo-voltaic power generation equipment that can automatically track the sun of claim 1, wherein an included angle between a moving direction of the telescopic link and a horizontal direction is 60° to 80°.

7. The photo-voltaic power generation equipment that can automatically track the sun of claim 1, wherein an adjustment range of an elevation angle of the solar cell panel platform is 0° to 55°.

8. The photo-voltaic power generation equipment that can automatically track the sun of claim 1, wherein a circumferential rotation angle of the pedestal is 360°.

9. The photo-voltaic power generation equipment that can automatically track the sun of claim 1, wherein the two right arms of the main support arms are installed in the shape of an inverted "V", the upper ends of the two right arms are combined and hinged to the solar cell panel platform, and the lower ends of the two right arms are fixed on an outer circumference of the pedestal.

* * * * *